(12) United States Patent
Okino (10) Patent No.: US 9,805,043 B2
(45) Date of Patent: Oct. 31, 2017

(54) INFORMATION PROCESSING DEVICE, PROGRAM, AND RECORDING MEDIUM

(71) Applicant: Sony Computer Entertainment Inc., Tokyo (JP)

(72) Inventor: Naoto Okino, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 533 days.

(21) Appl. No.: 14/514,527

(22) Filed: Oct. 15, 2014

(65) Prior Publication Data

US 2015/0127692 A1   May 7, 2015

(30) Foreign Application Priority Data

Nov. 1, 2013 (JP) .................................. 2013-228810

(51) Int. Cl.
*G06F 17/30* (2006.01)

(52) U.S. Cl.
CPC .............................. *G06F 17/30135* (2013.01)

(58) Field of Classification Search
CPC ................................................ G06F 17/30135
See application file for complete search history.

(56) References Cited

U.S. PATENT DOCUMENTS

| 7,831,793 | B2 | 11/2010 | Chakravarty | |
| 8,904,137 | B1* | 12/2014 | Zhang | G06F 17/30135 |
| | | | | 711/165 |
| 2007/0208788 | A1 | 9/2007 | Chakravarty | |
| 2011/0099326 | A1* | 4/2011 | Jung | G06F 12/0246 |
| | | | | 711/103 |
| 2013/0166820 | A1* | 6/2013 | Batwara | G06F 12/0246 |
| | | | | 711/103 |
| 2015/0006788 | A1* | 1/2015 | Liu | G06F 3/0685 |
| | | | | 711/103 |

FOREIGN PATENT DOCUMENTS

JP   2007234026 A   9/2007

OTHER PUBLICATIONS

Office Action for corresponding JP Patent Application No. 2013-228810, dated Oct. 6, 2015.

* cited by examiner

*Primary Examiner* — Albert Phillips, III
(74) *Attorney, Agent, or Firm* — Matthew B. Dernier, Esq.

(57) ABSTRACT

An information processing device includes: a metadata retaining section retaining metadata of a file formed by a plurality of data blocks; a correspondence file retaining section retaining a correspondence file associating information identifying a recording location of a data block with information identifying the metadata retaining section retaining the metadata of the data block; a change processing section changing the recording location of the data block; and an update processing section updating the metadata retained by the metadata retaining section. The update processing section refers to the correspondence file, identifies the metadata retaining section retaining the metadata of the data block whose recording location is changed by the change processing section, and updates the metadata.

15 Claims, 6 Drawing Sheets

<CORRESPONDENCE FILE FOR COMPACTION>

| BLOCK NUMBER | iNODE NUMBER/ INDIRECT BLOCK NUMBER |
|---|---|
| 219,653 | FLAG 1,10311 |
| 219,654 | FLAG 1,10311 |
| 220,123 | FLAG 0,42685 |
| 220,124 | FLAG 0,42685 |
| ⋮ | ⋮ |

<CORRESPONDENCE FILE FOR COMPACTION>

| BLOCK NUMBER | iNODE NUMBER/<br>INDIRECT BLOCK NUMBER |
|---|---|
| 219,653 | FLAG 1,10311 |
| 219,654 | FLAG 1,10311 |
| 220,123 | FLAG 0,42685 |
| 220,124 | FLAG 0,42685 |
| ⋮ | ⋮ |

FIG.6

INFORMATION PROCESSING DEVICE, PROGRAM, AND RECORDING MEDIUM

BACKGROUND

The present technology relates to an information processing technology managing files, program, and recording medium.

When the writing and deletion of files are repeated on a recording disk such as a hard disk or the like, files within the recording disk are arranged discontinuously, and fragmented free space thus occurs. As the fragmentation progresses, continuous free space is reduced, and there occurs a need to store one file in a state of being divided in two or more separate free spaces. When such divided storage of files is increased, a processing load on an operating system (OS) is increased, and an amount of movement of a drive head becomes larger. Thus, data reading/writing speed is decreased. Accordingly, software referred to as a compaction tool has been developed which rearranges files within the recording disk from a start and thereby eliminates the fragmentation of free space.

SUMMARY

In a file system, information on recording locations of files is managed. When the recording location of a file is changed by execution of the compaction tool, the recording location managing information needs to be updated to new recording location information. It has been pointed out that the execution of the compaction tool in related art takes time. There is thus a desire to develop a technology that can perform compaction efficiently.

According to a mode of the present technology, there is provided an information processing device. The information processing device includes: a metadata retaining section retaining metadata of a file formed by a plurality of data blocks; a correspondence file retaining section retaining a correspondence file associating information identifying a recording location of a data block with information identifying the metadata retaining section retaining the metadata of the data block; a change processing section changing the recording location of the data block; and an update processing section updating the metadata retained by the metadata retaining section. The update processing section refers to the correspondence file, identifies the metadata retaining section retaining the metadata of the data block whose recording location is changed by the change processing section, and updates the metadata.

According to another mode of the present technology, there is provided a program for a computer, including referring to a correspondence file associating a block number of a data block with an inode number of an inode managing the data block and identifying the inode managing the data block whose recording location is changed when the recording location of the data block is changed; updating the block number of the data block, the block number being included in the identified inode; and updating the block number of the data block, the block number being included in the correspondence file.

According to further another mode of the present technology, there is provided a computer readable recording medium for recording a program. The program for the computer includes referring to a correspondence file associating a block number of a data block with an inode number of an inode managing the data block and identifying the inode managing the data block whose recording location is changed when the recording location of the data block is changed; updating the block number of the data block, the block number being included in the identified inode; and updating the block number of the data block, the block number being included in the correspondence file.

It is to be noted that arbitrary combinations of the above constituent elements as well as modes obtained by converting expressions of the present technology between a method, a device, a system, a recording medium, a computer program, and the like are also effective as modes of the present technology.

According to the information processing technology in accordance with the present technology, processing such as compaction and the like can be performed efficiently.

DETAILED DESCRIPTION OF THE PREFERRED EMBODIMENTS

Figure 1:
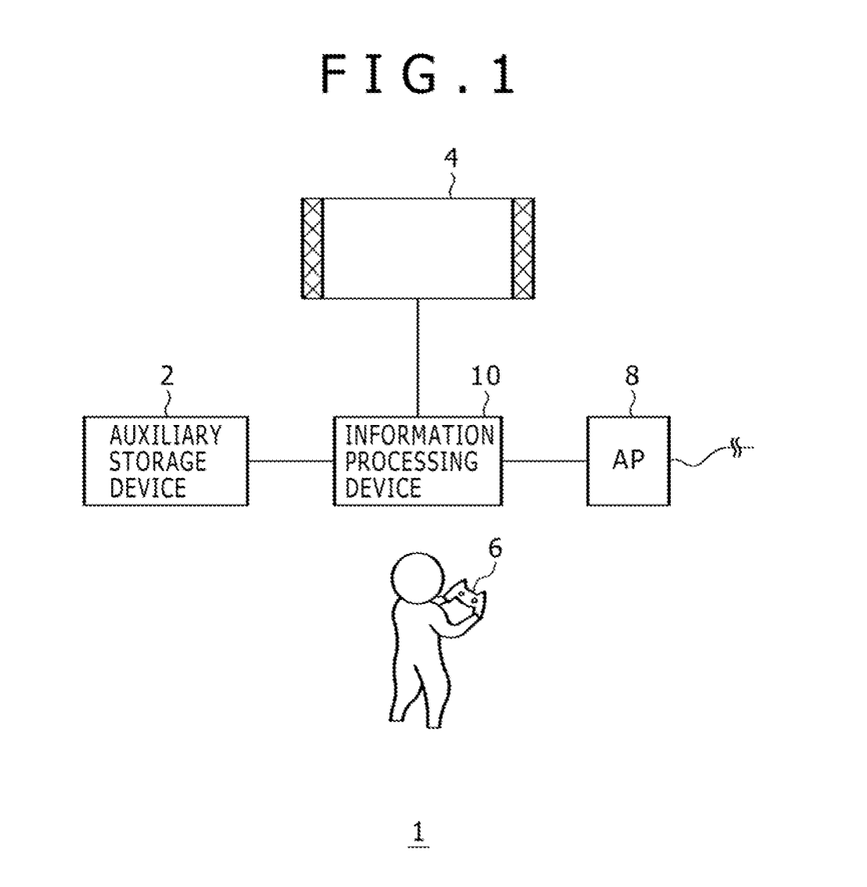
FIG. 1 is a diagram showing an information processing system according to an embodiment of the present technology.

FIG. 1 shows an information processing system 1 according to an embodiment of the present technology.

An information processing device 10 is connected to an input device 6 operated by a user by radio or wire. The input device 6 outputs operation information indicating a result of operation by the user to the information processing device 10. When receiving the operation information from the input device 6, the information processing device 10 reflects the operation information in processing of an OS (system software) or application software, and makes a result of the processing output from an output device 4. In the information processing system 1, the information processing device 10 is a game device executing game software. The input device 6 may be a device such as a game controller or the like supplying the user operation information to the information processing device 10. The input device 6 includes a plurality of input parts such as a plurality of push type operating buttons, an analog stick allowing an analog quantity to be input, a rotation type button, and the like.

An auxiliary storage device 2 is a mass storage device such as an HDD (Hard Disk Drive), a flash memory, or the like. The auxiliary storage device 2 may be an external storage device connected to the information processing device 10 by a USB (Universal Serial Bus) or the like, or may be an internal storage device. The output device 4 may be a television set including a display outputting an image and a speaker outputting sound, or may be a computer display. The output device 4 may be connected to the information processing device 10 by a wire cable, or may be connected to the information processing device 10 by radio.

An access point (hereinafter referred to as an "AP") 8 has functions of a wireless access point and a router. The information processing device 10 is connected to the AP 8 via radio or wire, and can thus be connected to a server on an external network such as the Internet or the like so as to be able to communicate with the server.

Figure 2:
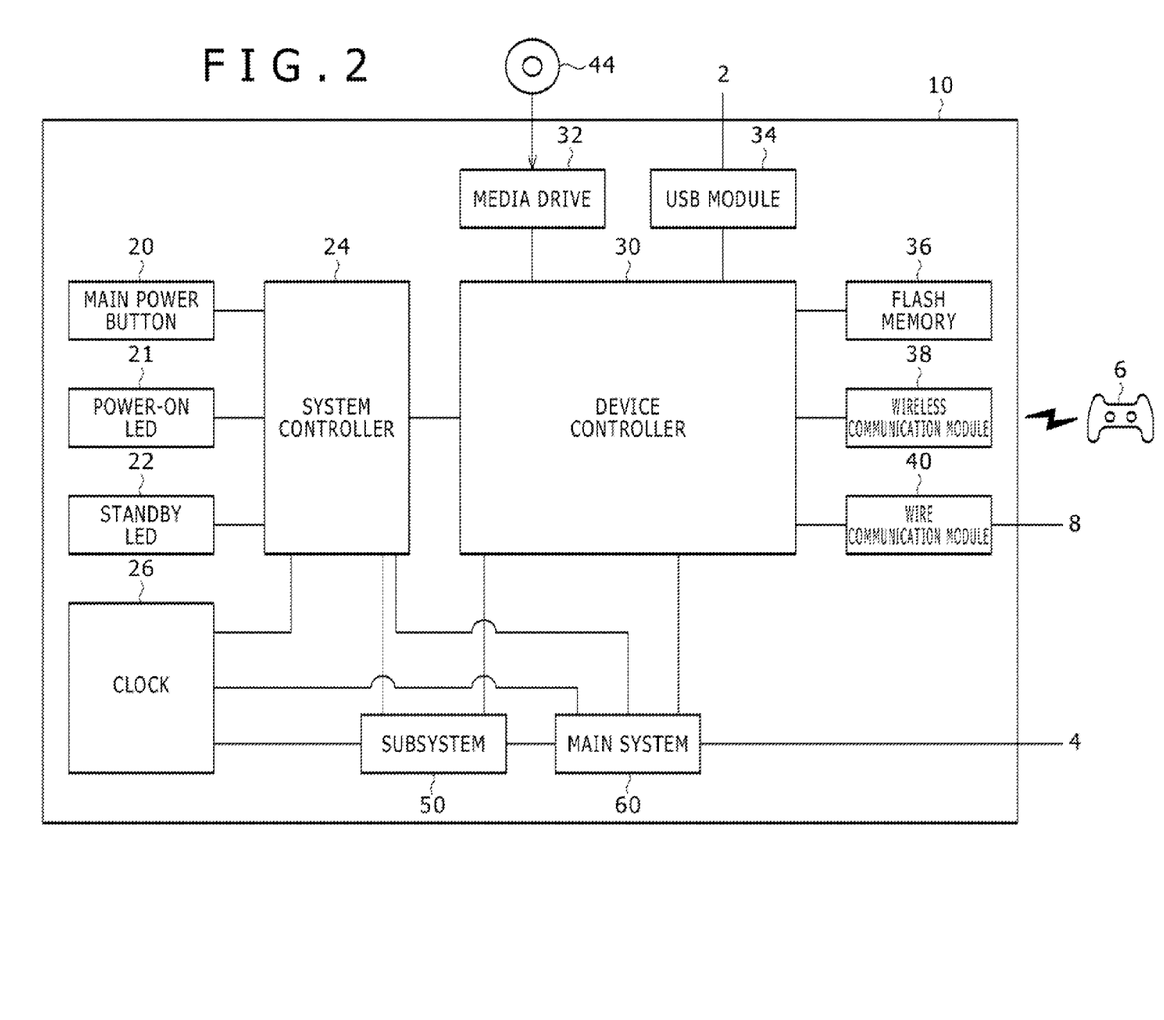
FIG. 2 is a diagram showing functional blocks of an information processing device.

FIG. 2 is a functional block diagram of the information processing device 10. The information processing device 10 includes a main power button 20, a power-on LED (Light Emitting Diode) 21, a standby LED 22, a system controller 24, a clock 26, a device controller 30, a media drive 32, a USB module 34, a flash memory 36, a wireless communication module 38, a wire communication module 40, a subsystem 50, and a main system 60.

The main system 60 includes a main CPU (Central Processing Unit), a memory as a main storage device and a memory controller, a GPU (Graphics Processing Unit), and the like. The GPU is used mainly for arithmetic processing of a game program. These functions may be constructed as a system on chip, and thus formed on one chip. The main CPU has a function of starting the OS and executing game software recorded in the auxiliary storage device 2 or on a ROM (Read Only Memory) medium 44 under an environment provided by the OS.

The subsystem 50 includes a sub-CPU, a memory as a main storage device and a memory controller, and the like. The subsystem 50 does not include a GPU. Number of circuit gates of the sub-CPU is smaller than number of circuit gates of the main CPU. Power consumption in operation of the sub-CPU is lower than power consumption in operation of the main CPU. As described above, the sub-CPU operates while the main CPU is in a standby state, and processing functions of the sub-CPU are limited to keep the power consumption low. Incidentally, the sub-CPU and the memory may be formed on separate chips.

The main power button 20 is an input part where operating input from the user is performed. The main power button 20 is provided to a front surface of a casing of the information processing device 10. The main power button 20 is operated to turn on or off a supply of power to the main system 60 of the information processing device 10. Hereinafter, an on state of a main power supply means that the main system 60 is in an active state, and an off state of the main power supply means that the main system 60 is in a standby state. The power-on LED 21 is lit when the main power button 20 is turned on. The standby LED 22 is lit when the main power button 20 is turned off.

The system controller 24 detects the depression of the main power button 20 by the user. When the main power button 20 is depressed while the main power supply is in an off state, the system controller 24 obtains the depressing operation as a "turn-on instruction." When the main power button 20 is depressed while the main power supply is in an on state, on the other hand, the system controller 24 obtains the depressing operation as a "turn-off instruction."

The main CPU has a function of executing a game program recorded in the auxiliary storage device 2 or on the ROM medium 44. On the other hand, the sub-CPU does not have such a function. However, the sub-CPU has a function of accessing the auxiliary storage device 2 and a function of transmitting and receiving information to and from the server on the network. The sub-CPU is configured to have only such limited processing functions. The sub-CPU can therefore operate with low power consumption as compared with the main CPU. These functions of the sub-CPU are performed while the main CPU is in a standby state.

The clock 26 is a real-time clock. The clock 26 generates present date and time information, and supplies the present date and time information to the system controller 24, the subsystem 50, and the main system 60.

The device controller 30 is configured as an LSI (Large-Scale Integrated Circuit) that transfers information between devices like a Southbridge. As shown in the figure, the device controller 30 is connected with devices such as the system controller 24, the media drive 32, the USB module 34, the flash memory 36, the wireless communication module 38, the wire communication module 40, the subsystem 50, the main system 60, and the like. The device controller 30 accommodates differences between electrical characteristics of the respective devices and differences between data transfer rates, and controls data transfer timing.

The media drive 32 is a drive device that is loaded with the ROM medium 44 on which application software such as a game or the like and license information are recorded, which drives the ROM medium 44, and which reads a program, data, and the like from the ROM medium 44. In the following, programs and data may be referred to collectively as data when the programs and the data are not particularly distinguished from each other. However, data will be used also to represent elements constituting files. The ROM medium 44 is a read-only recording medium such as an optical disk, a magneto-optical disk, a Blu-ray disk, or the like.

The USB module 34 is a module connected to an external device by a USB cable. The USB module 34 may be connected to the auxiliary storage device 2 by a USB cable. The flash memory 36 is an auxiliary storage device forming an internal storage. The wireless communication module 38 performs wireless communication with the input device 6, for example, under a communication protocol such as a Bluetooth (registered trademark) protocol, an IEEE802.11 protocol, or the like. Incidentally, the wireless communication module 38 may support a third-generation (3rd Generation) digital mobile telephone system compliant with an IMT-2000 (International Mobile Telecommunication 2000) standard defined by the ITU (International Telecommunication Union), or may further support a digital mobile telephone system of another generation. The wire communication module 40 performs wire communication with an external device. The wire communication module 40 is connected to the external network via the AP 8, for example.

The information processing device 10 according to the present embodiment manages files using a file management method used in UNIX (registered trademark).

A file is configured with one or a plurality of blocks allocated thereto. A block is a basic unit for a file system to transfer data. One block is set to a predetermined data size (for example 64 Kbytes). For example, a size of a save data file (hereinafter also referred to simply as "save data") of a game is set by the game. When the game sets the save data size at 320 Kbytes, five blocks are allocated to the save data. When the game sets the save data size at 1280 Kbytes, 20 blocks are allocated to the save data. Set for each file is an index table storing one or more recording locations of one or more data blocks constituting the file.

Figure 3:
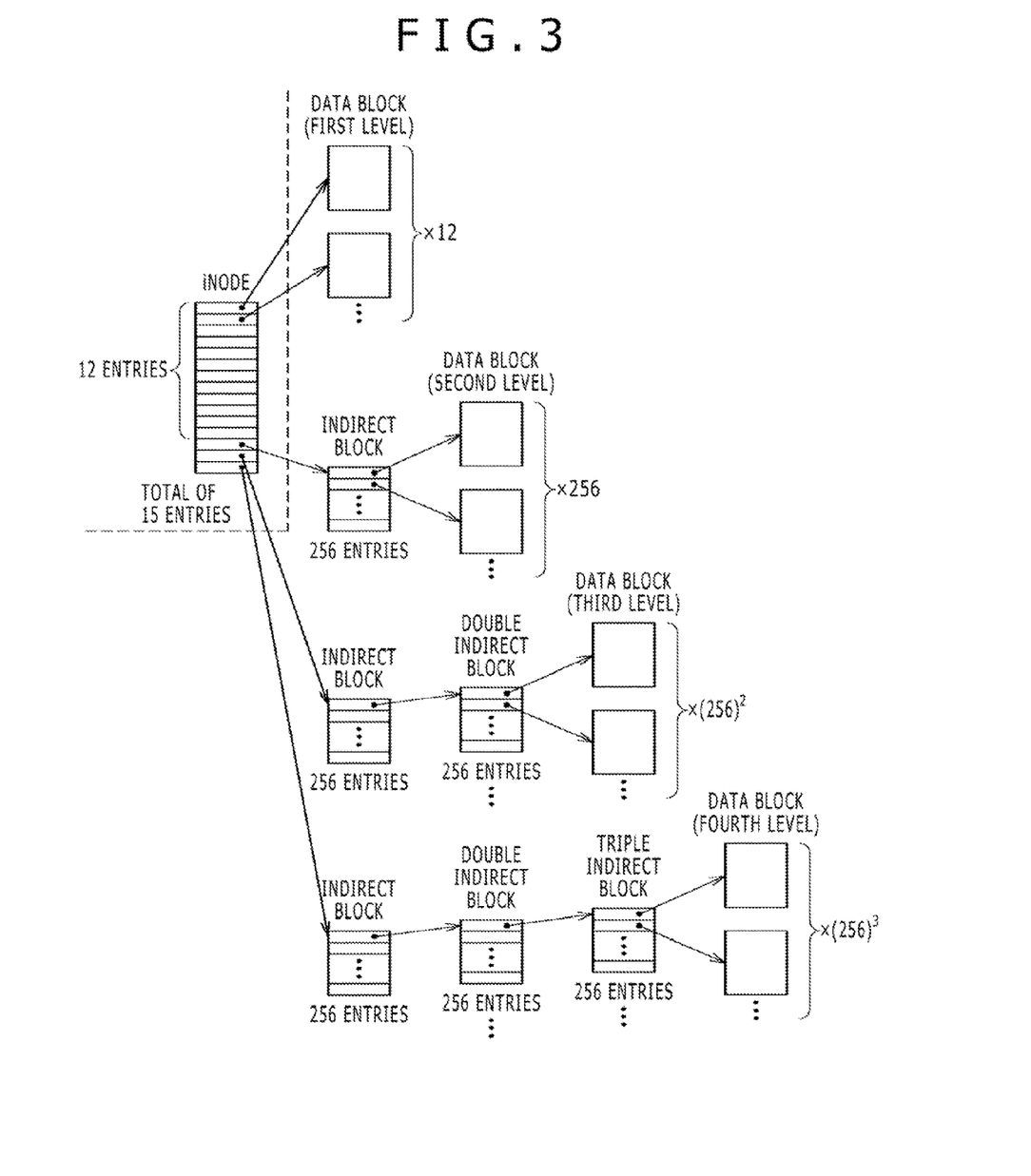
FIG. 3 is a diagram of assistance in explaining a data structure used addressing data blocks of a file.

FIG. 3 is a diagram of assistance in explaining a data structure used addressing the data blocks of a file. A first index table at a first level is referred to as an index node ("inode" for short), and has a total of 15 entries addressing the data blocks. All files are constituted of an inode and data blocks. The inode is given an inode number identifying the file in the file system. The inode has, as attribute information, the inode number, a type of the file, a byte length of the file, an access right, and the like.

Metadata related to data blocks is recorded in entries of the inode. Typically, information identifying the recording locations of the data blocks is recorded as the metadata. This information may be block numbers that specify a relative position from a start of a recording disk or a partition, for example. Incidentally, the information identifying the recording locations of the data blocks is not limited to block numbers, but may be for example information such as a block size calculating a block number, a file offset, or the like. In addition, the information identifying the recording locations of the data blocks may be sector numbers of the recording disk which sector numbers directly identify the recording locations.

A file name and the inode number (having a meaning as a pointer to the inode) of the inode managing the file are retained in association with each other in a data block of a directory. Hence, when the game program refers to the file by the file name, a kernel of the OS refers to information of a directory entry, obtains the inode number corresponding to the file name, and accesses the file using the block numbers included in the inode identified by the inode number.

Twelve entries of the inode are used to record the metadata of 12 data blocks from a start within the file. Hence, when the file is formed by 12 or fewer data blocks, the inode can record the metadata of the data blocks using entries the number of which is equal to the number of the blocks.

Incidentally, when the file is formed by 13 or more blocks, index tables at a plurality of levels are necessary. In the example shown in FIG. 3, the block number of an index table at a second level (indirect block) is recorded as metadata in the 13th entry of the inode. The 13th entry of the inode is linked to the indirect block, and is thus used for indirect reference in a first stage. The indirect block has 256 entries. Information identifying the recording locations of data blocks at the second level, or the block numbers of the data blocks at the second level in this case, are recorded as metadata in the entries of the indirect block.

The block number of an index table at the second level (indirect block) linking an index table at a third level (double indirect block) is recorded as metadata in the 14th entry of the inode. The block number of the double indirect block is recorded as metadata in an entry of the indirect block. The double indirect block has 256 entries. The block numbers of data blocks at the third level are recorded in the entries of the double indirect block. The 14th entry of the inode is thus used for indirect reference in a second stage.

The block number of an index table at the second level (indirect block) linking an index table at the third level (double indirect block) linking an index table at a fourth level (triple indirect block) is recorded as metadata in the 15th entry of the inode. The block number of the double indirect block is recorded as metadata in an entry of the indirect block. The block number of the triple indirect block is recorded as metadata in an entry of the double indirect block. The triple indirect block has 256 entries. The block numbers of data blocks at the fourth level are recorded in the entries of the triple indirect block. The 15th entry of the inode is thus used for indirect reference in a third stage.

The index tables at the second and subsequent levels may hereinafter be referred to collectively as indirect blocks.

Hence, when five blocks are allocated to save data, the save data file is managed by recording the metadata of the data blocks in five respective entries in the inode. When 20 blocks are allocated to save data, the save data file is managed by recording the metadata of the data blocks in 12 entries in the inode and 8 entries in the indirect block.

As described above, each inode is given an inode number for uniquely identifying the file. Each indirect block is also given an indirect block number for uniquely identifying each indirect block. The indirect block has the indirect block number given to the indirect block as attribute information. In one file system, an inode number is set so as not to be a duplicate, and an indirect block number is also set so as not to be a duplicate. Hence, when the OS specifies an inode number, the OS can refer to the inode of the inode number, and when the OS specifies an indirect block number, the OS can refer to the indirect block of the indirect block number.

Figures 4A, 4B:
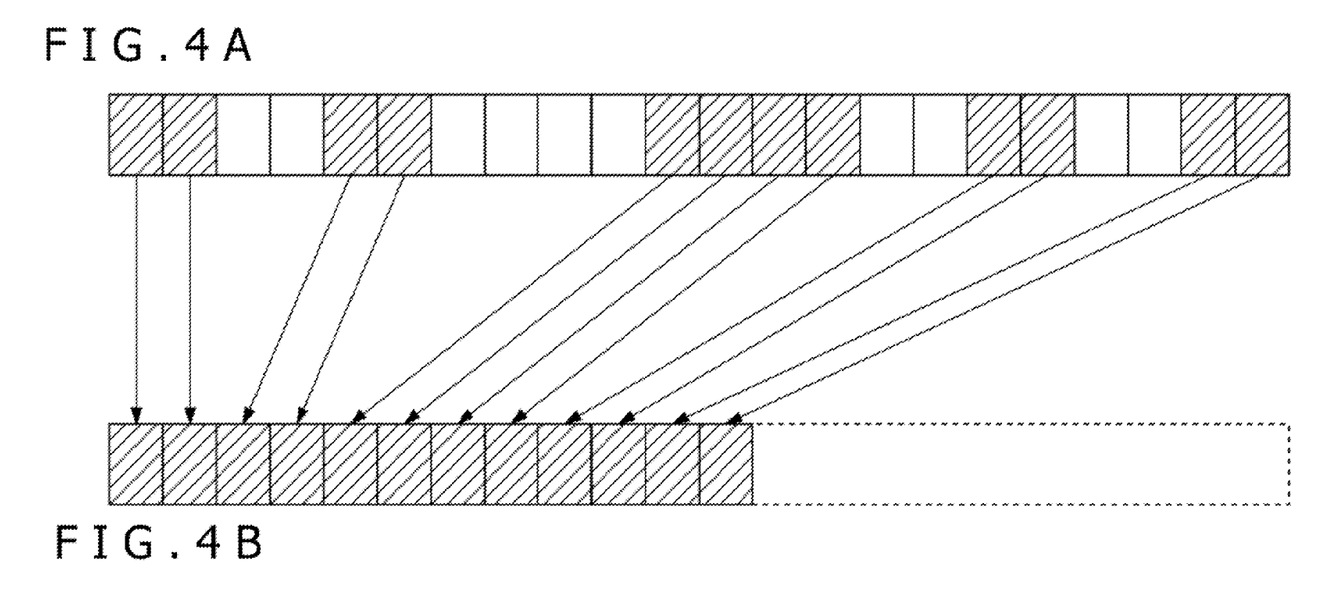
FIGS. 4A and 4B are diagrams schematically showing recording conditions of save data regions in an auxiliary storage device.

FIGS. 4A and 4B schematically show recording conditions of save data regions in the auxiliary storage device 2. FIG. 4A shows a state in which free space is fragmented. FIG. 4B shows a state in which the fragmentation of the free space is eliminated by compaction processing. Incidentally, horizontally long rectangular regions in FIG. 4A and FIG. 4B schematically represent save data recording regions. Frames in the horizontally long rectangular regions represent blocks. Hatched frames represent a state in which data is recorded. Frames that are not hatched represent a state in which data is not recorded.

When a compaction tool performs compaction processing for the save data regions, the recording locations of data blocks are changed as shown in FIG. 4B. As already described, the recording locations of data blocks are managed by an inode or an indirect block. Therefore, when moving a data block, the OS needs to search for the inode or the indirect block in which the block number of the data block is recorded, and rewrite the block number. However, one file system includes a plurality of files. Game software, in particular, may have a few ten thousand files in some cases. It thus takes time to search for the inode or the indirect block in which the metadata of the moved data block is recorded.

Accordingly, the present embodiment prepares a correspondence file for compaction for a file to be read/written, and allows the OS to refer to the correspondence file for compaction and immediately identify an inode or an indirect block in which metadata is to be updated when moving a data block to another recording region.

Figure 5:
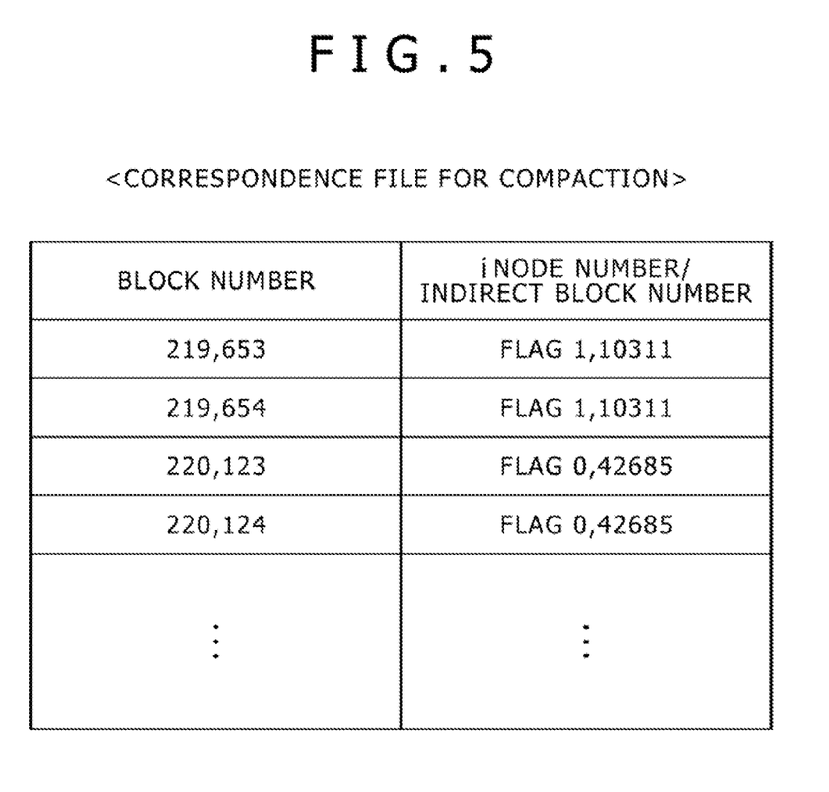
FIG. 5 is a diagram showing an example of a correspondence file for compaction.

FIG. 5 shows an example of the correspondence file for compaction.

The correspondence file associates the block number of a data block with the inode number of an inode or the indirect block number of an indirect block which inode or indirect block includes an entry in which the metadata of the data block is recorded. In the "iNODE NUMBER/INDIRECT BLOCK NUMBER" of a right item in the correspondence file, the inode number or the indirect block number is described, and also information identifying whether the described number is an inode number or an indirect block number is described. This identifying information may be described as a flag value. For example, a flag value 1 indicates that the number is an inode number, and a flag value 0 indicates that the number is an indirect block number.

In the correspondence file, the metadata of a data block recorded at a block number "219,653" is stored in an inode that retains an inode number "10311" as attribute information. In addition, the metadata of a data block recorded at a block number "220,123" is stored in an indirect block that retains an indirect block number "42685" as attribute information. Hence, when block numbers of a movement source and a movement destination are determined in compaction processing, the OS can identify an inode or an indirect block storing the block number of the movement source as metadata by using the correspondence file, update the block number of the movement source in the inode or the indirect block to the block number of the movement destination, and rewrite the block number of the movement source in the correspondence file to the block number of the movement destination.

Figure 6:
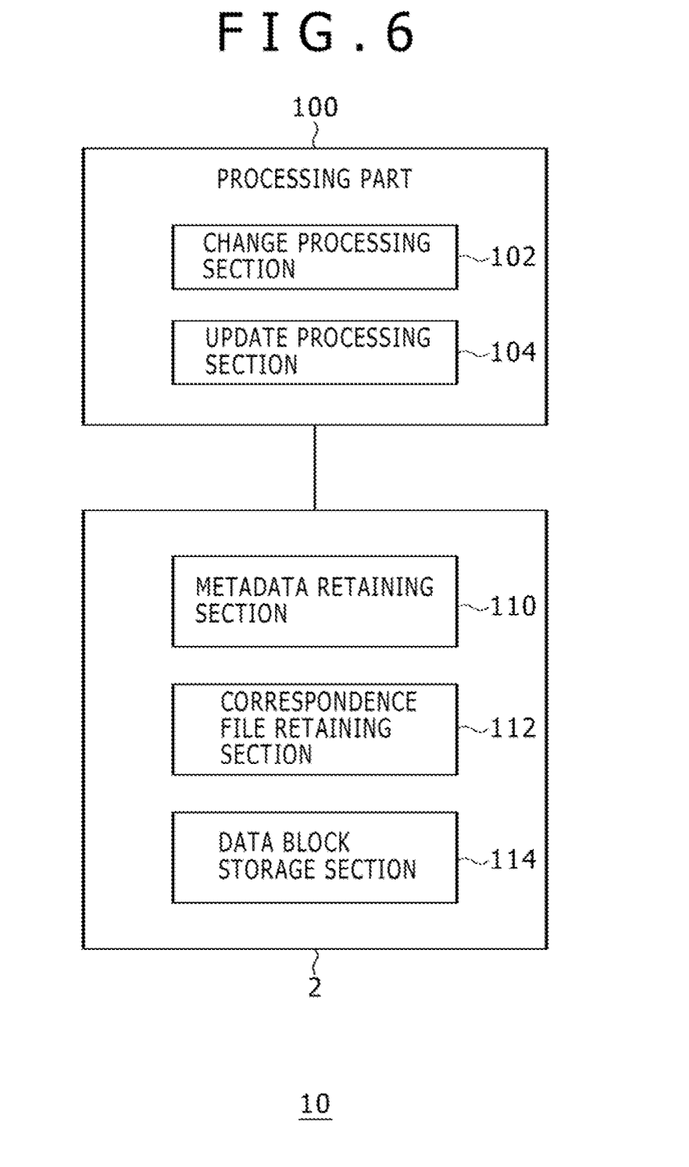
FIG. 6 is a diagram showing a configuration implementing a block managing function of the information processing device.

FIG. 6 shows a configuration implementing a block managing function of the information processing device 10. The information processing device 10 includes a processing part 100 and the auxiliary storage device 2. These constituent elements are implemented, in terms of hardware components, by the CPU of an arbitrary computer, a memory, a program loaded in the memory, a storage, and the like. In this case, however, the functional blocks implemented by cooperation of these components are depicted. Hence, it is to be understood by those skilled in the art that these functional blocks can be implemented in various forms by only hardware, only software, or a combination of hardware and software.

A metadata retaining section 110 retains the metadata of a file formed by a plurality of data blocks. The metadata retaining section 110 is an inode and/or an indirect block, or a recording region storing the inode and/or the indirect block. The file system according to the present embodiment has a list of inodes as file system management information. The metadata retaining section 110 may be the inode list or a recording region storing the inode list. The metadata retaining section 110 may also include an indirect block list or a recording region storing the indirect block list.

A correspondence file retaining section 112 retains the correspondence file for compaction which correspondence file is shown in FIG. 5. As already described, the correspondence file associates information identifying the recording location of a data block with information identifying the metadata retaining section 110 that retains the metadata of the data block, and specifically, the correspondence file associates the block number of a data block with the inode number of an inode or the indirect block number of an indirect block which inode or indirect block manages the data block.

Incidentally, the correspondence file does not need to be prepared for all data blocks constituting a file system. In a case of the file system of a game, for example, data groups constituting game software, such as program files and the like, are configured as non-rewritable read-only data. Therefore, when these data groups are recorded at consecutive block numbers, there is little need to perform compaction processing. Thus, the data blocks of these data groups may not be included in the correspondence file. Incidentally, when game software is downloaded from a network, it is assumed that there may be a case where a file is stored in a divided state. Thus, in such a case, the data blocks constituting the game software may be included in the correspondence file.

A data block storage section 114 stores a plurality of data blocks. As already described, the block numbers of the data blocks are described in the inode or the indirect block.

A change processing section 102 changes the recording location of a data block. For example, a function of the change processing section 102 may be implemented by a compaction tool performing compaction processing that rearranges data blocks recorded in recording regions. Incidentally, this function may also be implemented by a defragmentation tool.

An update processing section 104 has a function of updating the metadata retained by the metadata retaining section 110. This updating function is performed when the change processing section 102 changes the recording location of a data block. Specifically, the update processing section 104 refers to the correspondence file retained by the correspondence file retaining section 112, identifies the metadata retaining section 110 that retains the metadata of the data block whose recording location is changed by the change processing section 102, and updates the metadata in the metadata retaining section 110. The updated metadata includes at least information identifying the recording location of the data block. Specifically, the change processing section 102 updates the block number indicating the recording location of the data block to the block number of a change destination.

For example, suppose that the change processing section 102 performs compaction processing, and disposes the data block of the block number "219,653" at a block number "210,000." The change processing section 102 notifies the update processing section 104 that the data block is moved from the block number "219,653" to the block number "210,000."

Receiving this notification, the update processing section 104 refers to the correspondence file, and identifies the inode having the inode number "10311" as managing the data block stored in the recording region of the block number "219,653." Next, the update processing section 104 refers to the inode of the inode number "10311," identifies an entry in which the block number "219,653" is recorded, and updates the block number of the entry to "210,000."

The update processing section 104 can thus quickly identify the inode managing the moved data block by using the correspondence file without searching all inodes.

At the same time as the updating of the metadata, the update processing section 104 updates the information identifying the recording location of the data block, that is, the block number in the correspondence file. The block number in the record in a top row shown in FIG. 5 is thereby rewritten from "219,653" to "210,000."

When a new file is generated in the file system, and recorded in the auxiliary storage device 2, the update processing section 104 adds a relation between the block number of a data block and the inode number of an inode managing the data block as a new record to the correspondence file. In addition, when a file is deleted, the update processing section 104 deletes a corresponding record from the correspondence file. Therefore, the update processing section 104 can maintain the block numbers in the correspondence file in the latest state, and complete an inode metadata update in a short time whenever compaction processing may be performed.

The present technology has been described above on the basis of embodiments thereof. The embodiments are illustrative, and it is to be understood by those skilled in the art that combinations of constituent elements and processing processes of the embodiments are susceptible of various modifications and that such modifications also fall within the scope of the present technology. In the embodiments, description has been made of a case where the save data regions of a game are subjected to compaction processing. However, without being limited to save data, the present technology is applicable to cases where the recording regions of readable/writable data are subjected to compaction processing. In addition, without being limited to the data of games, the present technology is also applicable to cases where the recording locations of data of other applications are changed.

The present disclosure contains subject matter related to that disclosed in Japanese Priority Patent Application JP 2013-228810 filed in the Japan Patent Office on Nov. 1, 2013, the entire content of which is hereby incorporated by reference.

What is claimed is:

1. An information processing device, comprising:
a memory containing a plurality of data blocks constituting a computer data file;
a file management system comprising a direct index table containing a plurality of metadata entries, wherein:
(i) each of a subset of the plurality of metadata entries of the direct index table containing a data block number reference to a respective one of a base subset of the plurality of data blocks, and
(ii) when a totality of the plurality of data blocks of the computer data file is too large to be referenced by the subset of the plurality of metadata entries of the direct index table, then a first of the plurality of metadata entries outside the subset of the plurality of metadata entries of the direct index table, contains an indirect index table number reference to a first indirect index table containing a plurality of metadata entries, each metadata entry of the first indirect index table containing a data block number reference to a respective one of a first subset of the plurality of data blocks outside the base subset of the plurality of data blocks; and
a defragmenting system comprising a correspondence table including a plurality of entries, one entry for each of the plurality of data blocks of the computer file, each entry including a respective one of the block number references stored in association with a respective indicator flag and a respective index number, and the respective index flag indicating whether the respective index number references the direct index table or references the first indirect index table, wherein the defragmentation system operates to:
determine that at least one of the data blocks stored in the memory is to be moved from a current location to a new location,
search the correspondence table for entry containing the data block number reference for the at least one of the data blocks,
obtain the respective indicator flag and the respective index number for the at least one of the data blocks,
change the data block number reference for the at least one of the data blocks to a new data block reference number in accordance with the determination that the at least one of the data blocks is to be moved from the current location to the new location,
change the data block number reference in the correspondence table for the at least one of the data blocks to the new data block reference number, and
change the metadata entry of the direct index table or the first indirect index table referenced by the index number for the at least one of the data blocks to include the new data block reference number.

2. The information processing device of claim 1, wherein:
when the totality of the plurality of data blocks of the computer data file is too large to be referenced by the subset of the plurality of metadata entries of the direct index table and the plurality of metadata entries of the first indirect index table, then a second of the plurality of metadata entries outside the subset of the plurality of metadata entries of the direct index table, contains an indirect index table number reference to a second indirect index table containing a plurality of metadata entries,
each metadata entry of the second indirect index table contains a reference to a respective double indirect index table among a first plurality of double indirect index tables,
each of the respective double indirect index tables among the first plurality of double indirect index tables contains a plurality of metadata entries, each metadata entry of a respective one of the first plurality of double indirect index tables contains a data block number reference to a respective one of a plurality of second subsets of the plurality of data blocks outside the base subset and the first subset of the plurality of data blocks.

3. The information processing device of claim 2, wherein:
the respective index flag of each entry of the correspondence table indicates whether the respective index number references the direct index table, the first indirect index table, the second indirect index table, or one of the first plurality of double indirect index tables; and
the defragmentation system operates to change the metadata entry of the direct index table, the first indirect index table, the second indirect index table, or the one of the first plurality of double indirect index tables referenced by the index number for the at least one of the data blocks to include the new data block reference number.

4. The information processing device of claim 2, wherein:
when the totality of the plurality of data blocks of the computer data file is too large to be referenced by the subset of the plurality of metadata entries of the direct index table, the plurality of metadata entries of the first indirect index table, the plurality of metadata entries of the second indirect index table, and the plurality of metadata entries of the first plurality of double indirect index tables, then a third of the plurality of metadata entries outside the subset of the plurality of metadata entries of the direct index table, contains an indirect index table number reference to a third indirect index table containing a plurality of metadata entries,
each metadata entry of the third indirect index table contains a reference to a respective double indirect index table among a second plurality of double indirect index tables,
each of the respective double indirect index tables among the second plurality of double indirect index tables contains a plurality of metadata entries, each metadata entry of a respective one of the second plurality of double indirect index tables contains a data block number reference to a respective one of a plurality of third subsets of the plurality of data blocks outside the base subset, the first subset, and the plurality of second subsets of the plurality of data blocks.

5. The information processing device of claim 4, wherein:
the respective index flag of each entry of the correspondence table indicates whether the respective index number references the direct index table, the first indirect index table, the second indirect index table, one of the first plurality of double indirect index tables, or one of the second plurality of double indirect index tables; and
the defragmentation system operates to change the metadata entry of the direct index table, the first indirect index table, the second indirect index table, the one of the first plurality of double indirect index tables, or the one of the second plurality of double indirect index tables referenced by the index number for the at least one of the data blocks to include the new data block reference number.

6. A method, comprising:

storing a plurality of data blocks constituting a computer data file in a memory;

providing a direct index table containing a plurality of metadata entries, wherein:

(i) each of a subset of the plurality of metadata entries of the direct index table containing a data block number reference to a respective one of a base subset of the plurality of data blocks, and (ii) when a totality of the plurality of data blocks of the computer data file is too large to be referenced by the subset of the plurality of metadata entries of the direct index table, then a first of the plurality of metadata entries outside the subset of the plurality of metadata entries of the direct index table, contains an indirect index table number reference to a first indirect index table containing a plurality of metadata entries, each metadata entry of the first indirect index table containing a data block number reference to a respective one of a first subset of the plurality of data blocks outside the base subset of the plurality of data blocks;

providing a correspondence table including a plurality of entries, one entry for each of the plurality of data blocks of the computer file, each entry including a respective one of the block number references stored in association with a respective indicator flag and a respective index number, and the respective index flag indicating whether the respective index number references the direct index table or references the first indirect index table; and defragmenting the stored plurality of data blocks by:

determining that at least one of the data blocks stored in the memory is to be moved from a current location to a new location, searching the correspondence table for entry containing the data block number reference for the at least one of the data blocks, obtaining the respective indicator flag and the respective index number for the at least one of the data blocks, changing the data block number reference for the at least one of the data blocks to a new data block reference number in accordance with the determination that the at least one of the data blocks is to be moved from the current location to the new location, changing the data block number reference in the correspondence table for the at least one of the data blocks to the new data block reference number, and changing the metadata entry of the direct index table or the first indirect index table referenced by the index number for the at least one of the data blocks to include the new data block reference number.

7. The method of claim 6, wherein:

when the totality of the plurality of data blocks of the computer data file is too large to be referenced by the subset of the plurality of metadata entries of the direct index table and the plurality of metadata entries of the first indirect index table, then a second of the plurality of metadata entries outside the subset of the plurality of metadata entries of the direct index table, contains an indirect index table number reference to a second indirect index table containing a plurality of metadata entries, each metadata entry of the second indirect index table contains a reference to a respective double indirect index table among a first plurality of double indirect index tables, each of the respective double indirect index tables among the first plurality of double indirect index tables contains a plurality of metadata entries, each metadata entry of a respective one of the first plurality of double indirect index tables contains a data block number reference to a respective one of a plurality of second subsets of the plurality of data blocks outside the base subset and the first subset of the plurality of data blocks.

8. The method of claim 7, wherein:

the respective index flag of each entry of the correspondence table indicates whether the respective index number references the direct index table, the first indirect index table, the second indirect index table, or one of the first plurality of double indirect index tables; and the defragmenting includes changing the metadata entry of the direct index table, the first indirect index table, the second indirect index table, or the one of the first plurality of double indirect index tables referenced by the index number for the at least one of the data blocks to include the new data block reference number.

9. The method of claim 7, wherein:

when the totality of the plurality of data blocks of the computer data file is too large to be referenced by the subset of the plurality of metadata entries of the direct index table, the plurality of metadata entries of the first indirect index table, the plurality of metadata entries of the second indirect index table, and the plurality of metadata entries of the first plurality of double indirect index tables, then a third of the plurality of metadata entries outside the subset of the plurality of metadata entries of the direct index table, contains an indirect index table number reference to a third indirect index table containing a plurality of metadata entries, each metadata entry of the third indirect index table contains a reference to a respective double indirect index table among a second plurality of double indirect index tables, each of the respective double indirect index tables among the second plurality of double indirect index tables contains a plurality of metadata entries, each metadata entry of a respective one of the second plurality of double indirect index tables contains a data block number reference to a respective one of a plurality of third subsets of the plurality of data blocks outside the base subset, the first subset, and the plurality of second subsets of the plurality of data blocks.

10. The method of claim 9, wherein:

the respective index flag of each entry of the correspondence table indicates whether the respective index number references the direct index table, the first indirect index table, the second indirect index table, one of the first plurality of double indirect index tables, or one of the second plurality of double indirect index tables; and the defragmenting includes changing the metadata entry of the direct index table, the first indirect index table, the second indirect index table, the one of the first plurality of double indirect index tables, or the one of the second plurality of double indirect index tables referenced by the index number for the at least one of the data blocks to include the new data block reference number.

11. A non-transitory, computer readable storage medium containing a computer program, which when executed by a computer system, causes the computer system to carry out actions, comprising:
storing a plurality of data blocks constituting a computer data file in a memory;
providing a direct index table containing a plurality of metadata entries, wherein:
(i) each of a subset of the plurality of metadata entries of the direct index table containing a data block number reference to a respective one of a base subset of the plurality of data blocks, and
(ii) when a totality of the plurality of data blocks of the computer data file is too large to be referenced by the subset of the plurality of metadata entries of the direct index table, then a first of the plurality of metadata entries outside the subset of the plurality of metadata entries of the direct index table, contains an indirect index table number reference to a first indirect index table containing a plurality of metadata entries, each metadata entry of the first indirect index table containing a data block number reference to a respective one of a first subset of the plurality of data blocks outside the base subset of the plurality of data blocks;
providing a correspondence table including a plurality of entries, one entry for each of the plurality of data blocks of the computer file, each entry including a respective one of the block number references stored in association with a respective indicator flag and a respective index number, and the respective index flag indicating whether the respective index number references the direct index table or references the first indirect index table; and
defragmenting the stored plurality of data blocks by:
determining that at least one of the data blocks stored in the memory is to be moved from a current location to a new location,
searching the correspondence table for entry containing the data block number reference for the at least one of the data blocks,
obtaining the respective indicator flag and the respective index number for the at least one of the data blocks,
changing the data block number reference for the at least one of the data blocks to a new data block reference number in accordance with the determination that the at least one of the data blocks is to be moved from the current location to the new location,
changing the data block number reference in the correspondence table for the at least one of the data blocks to the new data block reference number, and
changing the metadata entry of the direct index table or the first indirect index table referenced by the index number for the at least one of the data blocks to include the new data block reference number.

12. The non-transitory, computer readable storage medium containing a computer program of claim 11, wherein:
when the totality of the plurality of data blocks of the computer data file is too large to be referenced by the subset of the plurality of metadata entries of the direct index table and the plurality of metadata entries of the first indirect index table, then a second of the plurality of metadata entries outside the subset of the plurality of metadata entries of the direct index table, contains an indirect index table number reference to a second indirect index table containing a plurality of metadata entries,
each metadata entry of the second indirect index table contains a reference to a respective double indirect index table among a first plurality of double indirect index tables,
each of the respective double indirect index tables among the first plurality of double indirect index tables contains a plurality of metadata entries, each metadata entry of a respective one of the first plurality of double indirect index tables contains a data block number reference to a respective one of a plurality of second subsets of the plurality of data blocks outside the base subset and the first subset of the plurality of data blocks.

13. The non-transitory, computer readable storage medium containing a computer program of claim 12, wherein:
the respective index flag of each entry of the correspondence table indicates whether the respective index number references the direct index table, the first indirect index table, the second indirect index table, or one of the first plurality of double indirect index tables; and
the defragmenting includes changing the metadata entry of the direct index table, the first indirect index table, the second indirect index table, or the one of the first plurality of double indirect index tables referenced by the index number for the at least one of the data blocks to include the new data block reference number.

14. The non-transitory, computer readable storage medium containing a computer program of claim 12, wherein:
when the totality of the plurality of data blocks of the computer data file is too large to be referenced by the subset of the plurality of metadata entries of the direct index table, the plurality of metadata entries of the first indirect index table, the plurality of metadata entries of the second indirect index table, and the plurality of metadata entries of the first plurality of double indirect index tables, then a third of the plurality of metadata entries outside the subset of the plurality of metadata entries of the direct index table, contains an indirect index table number reference to a third indirect index table containing a plurality of metadata entries,
each metadata entry of the third indirect index table contains a reference to a respective double indirect index table among a second plurality of double indirect index tables,
each of the respective double indirect index tables among the second plurality of double indirect index tables contains a plurality of metadata entries, each metadata entry of a respective one of the second plurality of double indirect index tables contains a data block number reference to a respective one of a plurality of third subsets of the plurality of data blocks outside the base subset, the first subset, and the plurality of second subsets of the plurality of data blocks.

15. The non-transitory, computer readable storage medium containing a computer program of claim 14, wherein:
the respective index flag of each entry of the correspondence table indicates whether the respective index number references the direct index table, the first indirect index table, the second indirect index table, one of the first plurality of double indirect index tables, or one of the second plurality of double indirect index tables; and the defragmenting includes changing the metadata entry of the direct index table, the first indirect index table, the second indirect index table, the one of the first plurality of double indirect index tables, or the one of the second plurality of double indirect index tables referenced by the index number for the at least one of the data blocks to include the new data block reference number.

\* \* \* \* \*